United States Patent [19]

Tomka

[11] 4,352,695
[45] Oct. 5, 1982

[54] NOVEL GELATINS, PROCESSES FOR THEIR PREPARATION AND THEIR USE

[75] Inventor: Ivan Tomka, Bourguillon, Switzerland

[73] Assignee: Ciba-Geigy AG, Basel, Switzerland

[21] Appl. No.: 184,568

[22] Filed: Sep. 5, 1980

[30] Foreign Application Priority Data

Sep. 17, 1979 [CH] Switzerland .................. 8382/79

[51] Int. Cl.³ .................... C09D 3/04; C09H 11/00
[52] U.S. Cl. ................................ 106/135; 260/117;
260/118; 426/576; 430/138; 430/642
[58] Field of Search ............... 260/117, 118; 106/135;
430/642, 138; 426/576

[56] References Cited

U.S. PATENT DOCUMENTS

| 1,735,356 | 11/1929 | Neff .................... 260/117 |
| 3,075,961 | 1/1963 | Veis et al. ............ 260/117 |
| 3,131,130 | 4/1964 | Oneson ................ 106/161 |
| 3,396,027 | 8/1968 | McFall et al. ........ 430/642 |
| 3,628,974 | 12/1971 | Battista ............... 106/125 |
| 3,748,142 | 7/1973 | Battista ............... 430/642 |
| 4,151,306 | 4/1979 | Williams .............. 426/456 |

FOREIGN PATENT DOCUMENTS 344238 11/1921 Fed. Rep. of Germany .

OTHER PUBLICATIONS

Glafkides, "Chimie et Physique Photographiques," Aug. 3, 1976.
Chemical Abstracts 54:1032c, 1957.
"A Dictionary for Unit Conversion", Yishu Chiu, p. 314, 1975.

Primary Examiner—Theodore Morris
Attorney, Agent, or Firm—Joseph G. Kolodny

[57] ABSTRACT

Gelatins which have a high setting speed but a lowered viscosity are prepared by lowering their microgel content. For this purpose, aqueous gelatin solutions are subjected to the action of mechanical shearing forces, the shear stresses being between $10^4$ and $10^8$ Pascal. The peptide content of the gelatin remains virtually unchanged with this process.

16 Claims, No Drawings

NOVEL GELATINS, PROCESSES FOR THEIR PREPARATION AND THEIR USE

The present invention relates to novel gelatins, which are obtained when aqueous gelatin solutions are subjected to the action of mechanical shearing forces, and to the use of these gelatins as binders in photographic materials.

Photographic materials as a rule consist of a flat substrate, to which at least one, but as a rule several, thin layers have been applied. At least one of these layers is sensitive to light; further layers, which may or may not be sensitive to light, fulfill diverse auxiliary functions as, for example, protective layers, filter layers or antihalo layers.

Apart from special cases, for example vapour-deposited layers, a binder is always required for the production of photographic layers, this binder imparting the necessary cohesion and adhesion. For conventional photographic materials, which after exposure are processed with aqueous solutions, a hydrophilic binder which is swellable in water is preferred. Gelatin is particularly suitable as such a binder and because of its unique properties has optimum suitability for this purpose. The following properties in particular play an important role:

the chemical properties of gelatin itself and of the substances which naturally accompany it; these properties enable silver halide layers with particularly high sensitivity to light to be prepared;

the advantageous characteristics as a protective colloid, which permit the preparation and stabilisation of finely dispersed emulsions and dispersions, especially of silver halides;

the swellability and wettability, which impart a good permeability for aqueous solutions and, at the same time, good mechanical strength, and the physical properties, which favour the application and subsequent drying of uniform, thin layers.

In addition, gelatin possesses good variability in respect of its chemical and physical properties, and this makes it suitable for the preparation of a very broad spectrum of photographic materials for which the demands are very diverse. By suitable choice of the raw materials and of the processing technology, the properties of the gelatin can be substantially matched to the particular intended application. This applies both in respect of the chemical and of the physical properties of gelatin.

Nevertheless, the prior art disclosed to date still exhibits certain gaps which hitherto have meant that it has not been possible to combine certain characteristics in one type of gelatin at one and the same time. One of these gaps relates to the fact that there has been no means of independently influencing the viscosity and the setting speed of aqueous gelatin solutions.

As is known, the viscosity of solutions of high molecular weight substances is in general a clear function of the molecular weight; the higher the molecular weight of the dissolved substance, the higher the viscosity of the solution. On the other hand, however, the setting speed of gelatin solutions is to some extent also a function of the molecular weight and hitherto it has not been possible to influence the two properties independently of one another. It is true that it has been possible hitherto, without difficulty, to prepare gelatins with a high or low viscosity as desired, by special measures when selecting the raw materials and during processing thereof. However, in all cases a high viscosity was associated with a high setting speed and a low viscosity, on the other hand, with a low setting speed.

As is known, aqueous gelatin solutions are liquid only at relatively high temperatures. Below about 30° C., they solidify to an elastic gel within a relatively short or long time. Only very dilute solutions with a concentration of less than about 1% are an exception to this; these solutions remain liquid at all temperatures. The ability to set to a non-flowing gel is an important characteristic which greatly facilitates, if it is not entirely responsible for enabling, the production and drying of precise, thin layers.

The photographic layers are always applied in the liquid state to the substrate, and frequently even several liquid layers are applied at the same time. The layers must then be dried. This is most rapidly and most advantageously effected by blowing warm air onto the surface. Since it is not possible to roll up a material in which the layers have not dried, the application of the layer and drying must always be carried out continuously in one pass. For the drying operation, it is essential that the layers coated with high precision are not deformed either by force of gravity or by the moving warm air. In the case of gelatin-containing layers, this requirement can be met in a particularly simple manner by allowing the layers to solidify to a gel as rapidly as possible, by passing the coated base through a cooling section, prior to the start of the drying operation. The more rapidly the gelation of the layers takes place, the less is the technical effort required for the cooling section and the higher is the throughput speed which can be chosen. A general description of the coating and drying technology for photographic materials is given, for example, in B. M. Deryagin et al. "Film Coating Theory", Focal Press 1964.

The speed at which gelatin solutions set is in general dependent on the concentration and the temperature. It can be improved by increasing the gelatin concentration in the coating solution. However, the coating technology places certain limits on such a procedure, which may not be exceeded. Furthermore, in terms of colloid chemistry, coating solutions which are too concentrated are frequently unstable and can tend, for example, to demixing or to coagulation of individual components.

In coating technology it is therefore desirable to have available gelatins which possess a high setting speed even at relatively low concentrations. It should be possible to match the viscosity of the coating solutions to the particular requirements, independently of the setting speed. Depending on the coating technique employed and also on the thickness of the layers to be applied and on the speed of coating, the viscosities of the solutions used in photographic coating technology are between about 3 and 100 cP. Even higher viscosities of up to several hundred cP are also permissible, but only ever in exceptional cases when particular conditions require this, and with specific coating techniques, such as the curtain coating process described in German Auslegeschriften Nos. 1,928,025 and 1,928,031. At the indicated viscosity values, the gelatin concentration of the coating solutions must be between about 3 and 12%. It must also be taken into account that certain layer additives frequently used in photographic technology, for example anionic wetting agents and certain categories of dyes and colour couplers, can greatly increase the viscosity of the solutions. For this reason, there has hitherto frequently been no option but to use relatively low gelatin concentrations and, thus, to accept a long setting time.

Gelatin is usually a fairly heterogeneous mixture of polypeptides with molecular weights scattered within a wide range. The skin and demineralised animal bones (ossein) used as starting materials for the preparation of gelatin contain tropocollagen as the most important constituent; tropocollagen is a well-defined macromolecule consisting of three polypeptide chains linked to one another (two $\alpha_1$-chains and one $\alpha_2$-chain), and the build-up and aminoacid sequence of these chains are accurately known. For the production of gelatin, the raw material is subjected to an acid or alkaline digestion and the macromolecules are split in various ways depending on the treatment method and treatment time. The sum total of the cleavage products ultimately forms the gelatin. The latter is obtained from the digested mass by extraction with warm water, evaporation of the solution and drying of the residue. In this context see, for example, G. A. Wards & A. Courts: "The Science and Technology of Gelatin", Academic Press 1977.

Gelatin can be separated by various methods into a multiplicity of fractions of uniform molecular weight. In this context see, for example, I. Tomka et al. J. Phot. Sci. 23, 97 (1975). The following four fractions, which are present in various ratios depending on the origin of the gelatin, are differentiated as main constituents:

1. $\alpha$-gelatin: intact $\alpha$-polypeptide chains
   molecular weight $9.5 \times 10^4$
2. oligomers of the $\alpha$-chain, consisting of 2 to 15 linked $\alpha$-chains
   molecular weight $10^5$–$10^6$
3. "microgel": polymers of up to 1,000 linked $\alpha$-chains
   molecular weight $10^7$–$10^8$
4. "peptides": various sized fragments of the $\alpha$-chain
   molecular weight 1 to $9 \times 10^4$.

In this context see A. Veis, "The Macromolecular Chemistry of Gelatin", Academic Press 1978, and also I. Tomka, Chimia 30, 534 et seq. (1976 No. 12).

In the meantime it has been found that the four main fractions of gelatin determine its physical properties and usefulness in very different ways:

The $\alpha$-fraction and its oligomers up to a size of about 10–15 $\alpha$ units are the most valuable constituent. These fractions largely determine the solidifying characteristics of the gelatin solutions. Because of the upper limit on the molecular weight of these fractions, solutions thereof have a low to medium viscosity, such as is frequently desired for the production of photographic layers.

The fraction which is designated "microgel" and has the highest molecular weight is in any case present in a small amount, and experience has shown that because of this it does not contribute very much to the lattice structure of the gelled gelatin, and for this reason influences the speed of solidification to only a relatively slight extent. However, because its molecular weight is extremely high in some cases, this fraction is to a large extent that which determines the viscosity of the aqueous gelatin solutions. A high proportion of microgel is therefore undesirable in many cases, because it has an adverse effect on the properties in respect of coating technology.

In respect of the physical properties, the fraction comprising the peptides, i.e. the fragments of $\alpha$-gelatin, is the least valuable constituent of the gelatin. Peptides are formed on digestion of the gelatin raw material by saponification of peptide bonds within the $\alpha$-chain. They form an undesired constituent of gelatin. This is because it has been found that the peptides do not participate in the build-up of the gel network, but remains substantially in the sol form. They thus weaken the lattice structure and delay gel formation. Gelatins containing a large proportion of peptides therefore solidify only slowly.

If, on the other hand, an attempt is made to suppress peptide formation by the use of particularly mild digestion conditions, a gelatin is obtained which possesses a high proportion of microgel fraction and thus a correspondingly high viscosity.

The object of the present invention is to prepare gelatins which possess a high speed of solidification and the viscosity of which can be adjusted as desired between low and high viscosity values.

The object according to the invention is, thus, in particular so to change gelatins which have a high setting speed (and thus, of course, a high viscosity) that gelatins are obtained which have a viscosity which is lowered as desired, without, however, at the same time changing the desired high speeds of setting. The said object can be achieved by lowering the proportion of the microgel fraction without at the same time substantially increasing the proportion of the peptide fraction. This can be achieved by selective physical treatment of specific gelatin fractions.

It has been found that the microgel fraction can be split in a simple manner to give individual $\alpha$-chains or their oligomers consisting of a few chains, without further splitting to give low molecular weight peptides taking place at the same time, by subjecting aqueous gelatin solutions to high shearing forces for some time.

The present invention thus relates to a process for the preparation of gelatin with a high speed of solidification and reduced viscosity by lowering its microgel content without at the same time substantially increasing its peptide content, which comprises subjecting an aqueous gelatin solution to the action of mechanical shearing forces, the shear stress being between $10^4$ and $10^8$ Pascal.

The indicated shear stresses, which produce the shearing forces necessary according to the invention, are as a rule between $10^4$ and $10^8$ Pa (Pascal) and preferably between $10^5$ and $10^7$ Pa. High shear stresses of this type can be achieved in a known manner by means of high-pressure homogenisers, colloid mills, pinned disk mills or kneading machines or, for example, also by means of ultrasonic sound.

Depending on the apparatus used and on the viscosity of the gelatin solution to be treated, the shear rates necessary to produce the indicated shear stresses lie within very wide limits, for example between about 100 seconds$^{-1}$ in the case of a kneading machine and $10^8$–$10^9$ seconds$^{-1}$ in the case of a homogeniser apparatus with a gap of very narrow aperture. The viscosity of the gelatin solution to be treated is between about $10^5$ and $10^7$ cP (centipoise) (1 cP = $10^{-3}$ Pascal.second) in the former case and 1 to 10 cP in the latter case.

Glafkides (Photographic Chemistry, Volume I, page 278, Fountain Press, London) states that the action of ultrasonic sound on gelatin can lead to destruction, with the formation of ammonia and aldehydes, and not only does the viscosity fall but the ability to gel is also lost. In contrast, it has been found, surprisingly, that ultrasonic sound or other treatment using high shearing forces effects preferential break down at the linkage points between the individual α-chains, whilst the peptide bonds within the α-chains remain intact. It is thus possible drastically to lower the microgel content of a gelatin by means of a purely physical effect, the content of peptide fragments remaining virtually constant at the same time. The viscosity of the gelatin solution can be lowered in this way without simultaneously substantially prolonging the setting time.

The invention also relates to the gelatins obtained according to the process, their use as binders in the production of photographic layers (materials), and photographic materials which have at least one layer containing a gelatin according to the invention as the binder, and the use of the said gelatins as binders and/or base materials in the production of medicaments and the production of foodstuffs.

The gelatins according to the invention are also of particular advantage in the pharmaceutical and foodstuffs industries, as well as in the photographic industry. In the pharmaceutical industry, medical preparations are frequently packed in hard gelatin capsules. These hard capsules are produced in a dip process, with which particularly uniform capsules are obtained in a reproducible manner when the setting time of the gelatin used is very short. This production of hard capsules by the dip process is a further important field of application for the rapid-setting gelatins according to the invention, and because of the possibility of adjusting the viscosity of these gelatins to suit the particular purpose, the flow characteristics can also be utilised in an advantageous manner.

The above applies correspondingly in the case of gelatin for foodstuffs, for which short setting times can likewise be extremely desirable. For example, in the confectionery industry, in the production of marshmallows the strips produced from the beaten mixture must be so far solidified after about 30 seconds that they can be cut. During this time, the strip produced from the beaten mixture passes along 20 to 30 m long cooling belts. In this case, shortening of the setting time means that it is possible to cut earlier and that a substantial saving can be made in the size of installation. In the production of jelly sweets also, a shortening of the solidification time results in an acceleration of the production process and in a saving of, for example, powder boxes and storage space. Similarly, in the preserved fish and meats industries, a reduction in the setting time of the gelatin results in increased output and in a reduction of the size of an installation, since, for example, shorter cooling tunnels can be employed. For domestic purposes also, a gelatin with a short setting time is advantageous, since, for example, when preparing "jellies" or "brawn" it is no longer necessary to place the containers filled with gelatin solution in the refrigerator for several hours. Furthermore, the fact that commercially available gelatins gel too slowly has to date been an insurmountable obstacle to the use of gelatin for the preparation of flan fillings. Because solidification takes place too slowly, the gelatin solution which is still liquid penetrates into the base of the flan and softens this. For this reason only gelling agents which solidify rapidly, such as pectin, agar-agar, carrageenan and alginates, are used for flan fillings. A shortening of the solidification time means that gelatin can be used for this purpose also, and replacement of the abovementioned gelling agents by gelatin is particularly advantageous because those gelling agents which because of their short setting time are frequently employed not only in the confectionery trade but also in other branches of the foodstuffs industry have disadvantages from the point of view of taste and texture.

The gelatin concentration of the aqueous gelatin solutions to be employed can vary within wide limits and in particular is dependent on the nature of the equipment (machine) with which or in which the solution is to be treated. Concentrations of 1 to 30% by weight and preferably of 1 to 20% by weight of gelatin have as a rule proved appropriate.

By means of the process according to the invention it is possible, for example, to achieve a lowering of the microgel content to values of about 50 to 1% of the microgel content of the gelatin employed. The lowering can also be greater or smaller and can be controlled depending on the intended use of the gelatin.

A high-pressure homogeniser in the sense of the present invention is a device by means of which the gelatin solution to be treated is pressed by high hydraulic pressure, for example by means of a pump, through a narrow orifice. A colloid mill is a device in which the gelatin solution to be treated is passed through a narrow space delimited by two surfaces which are moving (for example rotating) in opposite directions. A pinned disk mill (peg mill) is a colloid mill in which the treatment space is formed by two circular disks which are fitted with pins and rotate at high speed in opposing directions.

A kneading machine consists of a vessel which has at least two helical stirrer blades, usually rotating in opposite directions, of a particular construction.

The gelatin solution can be treated in a high-pressure homogeniser batch-wise in a single pass, or in several passes, for example by circulating. The energy intensity with which, and the time for which, the treatment is carried out are, in general, such that the desired result is obtained. The temperature of the gelatin solution should not rise above about 60° C. and is as a rule between 20° and 60° C.

EXAMPLE 1

A sample $A_1$ of a gelatin of type A with a relatively high content of microgel fraction and a correspondingly high viscosity is subjected, in the form of a 1% aqueous solution, at a temperature of 40° C., in nine consecutive passes to high-pressure homogenisation with a pressure gradient of 200 bars. During this treatment a shear rate of between $10^8$ and $10^9$ seconds$^{-1}$, corresponding to a shear stress of $10^5$ to $10^6$ Pascal, prevails in the very narrow gap of the homogeniser. Per pass, a flow time of 1 minute is required for 1 liter of solution.

A further sample $A_2$ of the same type of gelatin is hydrolysed, in the form of a 5% aqueous solution, for 15 minutes at 40° C. by treatment with 1 normal hydrochloric acid.

The composition and physical properties of the untreated gelatin A and of the two treated samples $A_1$ and $A_2$ are given in Table 1 below:

TABLE 1

| Gelatin sample | A untreated | $A_1$ high-pressure homogenised | $A_2$ hydrolysed |
| --- | --- | --- | --- |
| Peptide fraction % | 15 | 15 | 30 |
| Microgel fraction % | 8.6 | 2.0 | 2.7 |

TABLE 1-continued

| Gelatin sample | A untreated | A$_1$ high-pressure homogenised | A$_2$ hydrolysed |
|---|---|---|---|
| Viscosity cP (5% solution, 40° C.) | 16 | 8 | 8 |
| setting time (seconds) (1.5% solution, 8° C.) | 49 | 50 | 77 |

As Table 1 shows, high-pressure homogenisation (A$_1$) has the effect of severely reducing the content of microgel fraction, whilst the proportion of peptide fraction remains unchanged.

The proportion of microgel fraction is also lowered by the hydrolytic treatment (A$_2$); at the same time, however, the proportion of peptide fraction rises to double its initial value.

For both samples, the viscosity of the solution has fallen to half the initial value. Whilst, however, sample A$_1$ treated in accordance with the invention still has virtually the same setting time as the untreated sample A, the setting time of the hydrolysed sample A$_2$ has risen by more than 50%. This is a consequence of the higher content of non-gelling peptides, which have formed as a result of hydrolytic splitting of α-chains.

Thus, whilst with the known method of lowering the viscosity of a gelatin by hydrolysis treatment a severe increase in the peptide content and a corresponding lengthening of the setting time must be accepted, it is possible, by treating the gelatin in accordance with the method of the invention, to achieve an equal lowering of the viscosity without lengthening the setting time.

EXAMPLE 2

Samples of two further types of gelatin, B and C, which compared with the gelatin used in Example 1 have a lower initial content of microgel fraction, are treated by high-pressure homogenisation in the same way as described in Example 1.

The composition and physical properties of the gelatins before and after treatment are given in Table 2 below:

TABLE 2

| Gelatin sample | untreated | | treated | |
|---|---|---|---|---|
| | B | C | B$_1$ | C$_1$ |
| Peptide fraction % | 20 | 34 | 20 | 33 |
| Microgel fraction % | 4.7 | 2.3 | 0.1 | 0.1 |
| Viscosity cP (5% solution, 40° C.) | 7.8 | 6.5 | 6.0 | 5.2 |
| Setting time (seconds) (1.5% solution, 8° C.) | 70 | 70 | 86 | 86 |

In the case of the two samples B$_1$ and C$_1$, it is observed that there is a substantial lowering in the proportion of microgel, whilst the peptide content remains the same. The lowering in the viscosity which results from this is in both cases accompanied by an only relatively slight prolongation of the setting time. Corresponding to the lower initial content of microgel, the lowering in the viscosity is less pronounced than in Example 1.

Table 3 lists the compositions of commercially available gelatins (samples I to XII), a and b giving the compositions of these gelatins before and after high-pressure homogenisation. It can be seen from the table that only the microgels are degraded and the content of oligomers of α-gelatin increases. An essential feature is that the peptide content is hardly changed.

TABLE 3

| Gelatin No. | I | | II | | III | | IV | | V | | VI | | VII | | VIII | | IX | | X | | XI | | XII | |
|---|---|---|---|---|---|---|---|---|---|---|---|---|---|---|---|---|---|---|---|---|---|---|---|---|
| | a | b | a | b | a | b | a | b | a | b | a | b | a | b | a | b | a | b | a | b | a | b | a | b |
| Peptides % (fragments of α-gelatin) | 41 | 35 | 36 | 38 | 30 | 28 | 40 | 40 | 42 | 47 | 38 | 39 | 22 | 23 | 34 | 33 | 23 | 24 | 38 | 39 | 31 | 33 | 38 | 37 |
| α-gelatin % | 18 | 21 | 22 | 23 | 25 | 26 | 16 | 17 | 9 | 10 | 19 | 19 | 37 | 36 | 20 | 17 | 23 | 22 | 29 | 28 | 30 | 29 | 22 | 24 |
| oligomers of α-gelatin | 39 | 44 | 40 | 39 | 42 | 46 | 42 | 43 | 44 | 43 | 42 | 42 | 39 | 41 | 43 | 50 | 52 | 54 | 32 | 32 | 38 | 39 | 39 | 39 |
| microgel % (high polymer) | 2.3 | 0.3 | 2.0 | 0.1 | 3.4 | 0.2 | 1.6 | 0.2 | 5.3 | 0.2 | 1.4 | 0.2 | 1.7 | 0.3 | 3.3 | 0.5 | 2.3 | 0.3 | 0.8 | 0.1 | 1.1 | 0.2 | 0.6 | 0.2 |
| viscosity mP 6.67% solution: 60° C. | 41 | 33 | 43 | 33 | 50 | 38 | 38 | 31 | 50 | 41 | 41 | 33 | 48 | 44 | 56 | 40 | 51 | 42 | 35 | 28 | 41 | 34 | 40 | 35 |

EXAMPLE 3

In this example the setting times and melting points of diverse types of gelatin are compared. The melting points, which are measured by a standardised process, are related to the setting time in that they are lower the longer the setting time. Like the latter, they are dependent on the gelatin concentration used, but they are also dependent on the temperature prevailing during setting of the gel. To determine the melting point, one drop of the gelatin solution is made to gel on a temperature-controlled substrate and is then brought to a higher, constant temperature by heating the substrate. By blowing on a stream of air, the strength of the gelled drop is tested. The temperature at which the drop is irreversibly deformed is taken as the melting point.

In Table 4 which follows, No. 1 is an untreated gelatin sample, No. 2 is the same type of gelatin subjected to high-pressure homogenisation by the process according to the invention and No. 3 is a commercially available type of gelatin which has a comparatively high peptide content and is suitable for photographic purposes.

It can be seen from the table that gelatin No. 1 possesses a short setting time and a high melting point and, at the same time, a high viscosity. After the treatment (sample 2), the viscosity has fallen sharply whilst the setting time and, the melting point are changed to only an insignificant extent. Sample 3 possesses a viscosity comparable to that of sample 2; however, because of the high peptide content, the setting is longer and the melting point is considerably lower. Therefore, if the properties in other respects are the same, sample 2, according to the invention, is more suitable than sample 3 for industrial processing to photographic materials.

TABLE 4

| Gelatin No. | 1 | | | 2 | | | 3 | | |
|---|---|---|---|---|---|---|---|---|---|
| Peptides % (fragments of α-gelatin) | 19 | | | 19 | | | 43.8 | | |
| α-gelatin % | 16.2 | | | 16.2 | | | 24.5 | | |
| Oligomers of α-gelatin % | 54.1 | | | 62.3 | | | 30.7 | | |
| Microgel % (high polymer) | 9.7 | | | 1.5 | | | 1.0 | | |
| Viscosity mP (6.67% solution; 60° C.) | 105 | | | 67 | | | 40.3 | | |
| Solidification temperature °C. | 5 | 10 | 15 | 5 | 10 | 15 | 5 | 10 | 15 |
| Cooling time of the apparatus, seconds | 8 | 8 | 8 | 8 | 8 | 8 | 8 | 8 | 8 |
| setting time, seconds (gelatin concentration 3.5%) | 13 | 24 | 65 | 13 | 28 | 78 | 23 | 37 | — |
| setting time, seconds (gelatin concentration 5.2%) | 6 | 8 | 15 | 6 | 8 | 19 | 12 | 15 | 25 |
| melting point °C. (gelatin concentration 3.5%) | 13.4 | 11.8 | 9.5 | 11.3 | 9.3 | 7.4 | — | — | — |
| melting point °C. (gelatin concentration 5.2%) | 20.2 | 19.7 | 18.4 | 18.9 | 18.4 | 17.0 | 18 | 16 | — |

EXAMPLE 4

A coating solution, prepared from 6 g of gelatin No. 1 (cf. Example 3), 1.5 g of the magenta dye of the formula

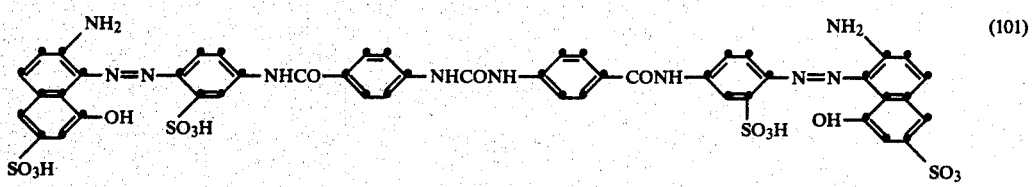

and 92.5 g of water, is coated onto a base using a curtain coater.

An identical sample is prepared and coated with a coating solution which contains gelatin No. 2 in place of gelatin No. 1. The coating weight in both cases is 140 g/m². The two samples are compared with regard to the homogeneity of the colour density resulting after drying. Inhomogeneous colour density results whenever the layers have not yet gelled at the particular setting temperature and setting time employed and for this reason are deformed by the stream of air blown on during drying.

In addition, the setting time and the melting points of the two coating solutions are compared by laboratory measurements (Table 5). In both cases, the melting point measured relates to a temperature of 0° C. in the setting zone, at a relative atmospheric humidity of 50%.

TABLE 5

| Gelatin sample | 1 | 2 |
|---|---|---|
| Setting time, seconds | 22.5 | 24.5 |
| Melting point °C. | 23 | 22.5 |

Corresponding to the similar values in the above table, the two samples behave virtually identically on machine drying under diverse drying conditions (temperature of the drying air).

EXAMPLE 5

With this example it can be shown that the properties of the gelatins according to the invention from the sensitometric point of view are equal to those of commercially available control gelatins. For this purpose, a silver halide emulsion suitable for graphic materials is prepared by precipitating the silver halide on the one hand in a solution of gelatin No. 2, which has been treated in accordance with the invention, and, for comparison, in solutions of the commercially available gelatin No. 3 and of the untreated gelatin No. 1 and then further processing the three samples by physical and chemical ripening in the conventional manner to give ready-for-use emulsions.

The characteristic and photographically relevant parameters for the three emulsions are given in Table 6 below.

TABLE 6

| | | Designation of the emulsion | | | | | | | | | | | | | | |
|---|---|---|---|---|---|---|---|---|---|---|---|---|---|---|---|---|
| | | 1 | | | | | 2 | | | | | 3 | | | | |
| Grain size in μ | | 0.75 | | | | | 0.75 | | | | | 0.28 | | | | |
| Gelatin used | Ripening | 1 | | | | | 2 | | | | | 3 | | | | |
| $D_{min}/D_{max}$ | | 0 | 0.05 | 0.1 | 0.2 | 0.3 | 0 | 0.05 | 0.1 | 0.2 | 0.3 | 0 | 0.05 | 0.1 | 0.2 | 0.3 |
| $\Delta\log E_{0.5}$ (rela- Exposure: 20 seconds; 5.5 Lux Developing: 3 minutes, 20° C. | sulfur | 0.42 | 1.15 | 1.26 | 1.30 | 1.31 | 0.40 | 1.24 | 1.29 | 1.32 | 1.27 | 0.55 | 1.30 | 1.33 | 1.35 | 1.35 |

TABLE 6-continued

| | | Designation of the emulsion | | | | | | | | | | | | | | |
|---|---|---|---|---|---|---|---|---|---|---|---|---|---|---|---|---|
| | | 1 | | | | | 2 | | | | | 3 | | | | |
| Grain size in μ | | 0.75 | | | | | 0.75 | | | | | 0.28 | | | | |
| Gelatin used | Ripening | 1 | | | | | 2 | | | | | 3 | | | | |
| Exposure: 20 seconds; 5.5 Lux Developing: 3 minutes, 20° C. | sulfur/ gold | 1.85 | 2.20 | 2.26 | 2.22 | 2.20 | 1.73 | 2.08 | 2.13 | 2.22 | 2.28 | 1.70 | 1.90 | 2.05 | 2.20 | 2.28 |
| Exposure: $10^{-6}$ seconds; 1 μ-Joule/cm$^2$ Developing: 3 minutes, 20° C. | sulfur | 1.05 | 1.88 | 1.92 | 1.95 | 1.96 | 0.93 | 1.94 | 1.98 | 2.03 | 2.06 | 0.85 | 1.92 | 2.00 | 2.05 | 2.05 |
| Exposure: 1 second, 125 Lux Developing: 35 seconds, 35° C. | sulfur | 1.55 | 2.58 | 2.61 | 2.61 | 2.58 | 1.60 | 2.55 | 2.58 | 2.59 | 2.59 | 1.32 | 2.58 | 2.61 | 2.61 | 2.58 |

The above table shows that, apart from slight differences which are due to the fact that the two gelatins are not of precisely identical origin, the photographic properties, and in particular the relative sensitivity of the two emulsions, lead to very similar values under identical precipitation and ripening conditions. However, as has been shown in the preceding Example 4, the emulsion according to the invention possesses considerably more advantageous physical properties.

EXAMPLE 6

A 10% solution is prepared from a gelatin sample and treated according to the invention by high-pressure homogenisation in order thus to reduce the microgel fraction and to lower the viscosity. The treatment is carried out once by the batch process using 10 single passes and a second time in a similar apparatus by a cyclic process. After each two passes, or after 10 minutes treatment in the cycle, a sample is taken and the viscosity is determined. In addition, the initial values and final values of the microgel content and the peptide content are measured. A 20% solution of the same gelatin sample is prepared and is also treated in the cyclic process. In this case, not only the viscosity but also the microgel content and peptide content of the samples for measuring, which are taken at regular intervals, are determined.

TABLE 7

Course of high-pressure homogenisation with time, treatment in the cyclic process

| | 10% gelatin solution | | | 20% gelatin solution | | |
|---|---|---|---|---|---|---|
| Time minutes | microgel % | peptide % | viscosity cP | microgel % | peptide % | viscosity cP |
| 0 | 8.7* | 20.9** | 38.5 | 9.3* | 19.7** | 450 |
| 10 | — | — | 34.0 | — | — | — |
| 20 | — | — | 34.0 | 2.5 | 23.1 | 400 |
| 40 | — | — | 30.5 | 2.2 | 23.1 | 385 |
| 60 | — | — | 29.0 | 2.5 | 20.3 | 380 |
| 90 | 0.8 | 21.5 | 28.0 | 2.1 | 19.5 | 375 |
| 120 | — | — | — | 2.0 | 19.8 | 370 |

**peptide fraction: accuracy of measurement ± 3%
*microgel fraction: accuracy of measurement ± 0.5%

TABLE 8

Course of high-pressure homogenisation with time, treatment by the batch process

| Number of passes | 10% gelatin solution Viscosity cP |
|---|---|
| 0 | 38.5 |
| 2 | 35.5 |
| 4 | 33.5 |
| 6 | 33.0 |
| 8 | 32.5 |
| 10 | 32.0 |

As can be seen from Tables 7 and 8, the effect of the treatment in the circulation process is very similar to that in the case of individual passes (batch process). The effect tends to be somewhat less advantageous in the case of the more highly concentrated solution, i.e. the solution had to be treated for a somewhat longer time in order to achieve the same end result.

The concentration of the peptide fraction can be regarded as being approximately constant during the treatment according to the invention. In the case of the microgel fraction, on the other hand, a distinct decrease is visible.

In respect of the viscosity of the solutions, the effect of the treatment according to the invention is clear.

What is claimed is:

1. A process for the preparation of gelatin with a high setting speed of solidification and reduced viscosity by lowering its microgel content without at the same time substantially increasing its peptide content, which comprises subjecting an aqueous gelatin solution to the action of mechanical shearing forces, the shear stress being between $10^4$ and $10^8$ Pascal.

2. A process according to claim 1, wherein the shear stress is between $10^5$ and $10^7$ Pascal.

3. A process according to claim 1, wherein the action of the mechanical shearing forces takes place at 30° to 60° C.

4. A process according to claim 1, wherein the gelatin solution contains 1 to 30% by weight of gelatin and the viscosity of the solution is between 1 and $10^7$ cP.

5. A process according to claim 1, wherein the aqueous gelatin solution is treated in a high-pressure homogeniser.

6. A process according to claim 5, wherein the viscosity of the gelatin solution is 1 to 10 cP.

7. A process according to claim 5, wherein the treatment is carried out batch-wise in one pass.

8. A process according to claim 5, wherein the treatment is carried out repeatedly in several passes.

9. A process according to claim 8, wherein the treatment is carried out with recirculation until the desired fraction distribution has been obtained.

10. A gelatin obtained by the process according to claim 1.

11. A gelatin which, compared with untreated gelatin, contains a lowered proportion of microgel whilst, at the same time, having a peptide content which is changed to only an insignificant extent.

12. A process for the production of photographic layers wherein a gelatin according to claim 10 is used as a binder.

13. A process for the production of carrier material for pharmaceuticals wherein the carrier material contains a gelatin according to claim 10.

14. A process according to claim 13 wherein the carrier material comprises capsules.

15. A process for the production of foodstuffs wherein a gelatin according to claim 10 is used.

16. Photographic material which contains, in at least one layer, a gelatin according to claim 10 as the binder.

* * * * *